United States Patent [19]

Doles

[11] 4,395,505

[45] Jul. 26, 1983

[54] ASCENSION PIPE AND ASCENSION PIPE CAP SEALERS FOR BY-PRODUCT COKE OVENS

[75] Inventor: Ronald S. Doles, Oak Lawn, Ill.

[73] Assignee: Nalco Chemical Company, Oak Brook, Ill.

[21] Appl. No.: 387,914

[22] Filed: Jun. 14, 1982

[51] Int. Cl.$^3$ .......................... C03C 5/02; C04B 35/00
[52] U.S. Cl. ......................................... 524/55; 501/14; 501/28; 501/65; 523/139; 523/140; 523/141; 524/183; 524/404; 524/405; 524/564
[58] Field of Search ................ 524/404, 405, 55, 183; 523/139, 140, 141; 501/14, 28, 65

[56] References Cited

U.S. PATENT DOCUMENTS

| | | | |
|---|---|---|---|
| 2,194,246 | 3/1940 | Oberländer et al. | 501/14 |
| 3,178,323 | 4/1965 | Brown et al. | 501/28 |
| 4,072,533 | 2/1978 | Barrall et al. | 106/84 |
| 4,169,735 | 10/1979 | Boberski et al. | 106/84 |
| 4,171,986 | 10/1979 | Freyhold et al. | 106/84 |
| 4,174,331 | 11/1979 | Myles | 524/405 |

FOREIGN PATENT DOCUMENTS 2256152  6/1974  Fed. Rep. of Germany ........ 501/28

*Primary Examiner*—Ronald W. Griffin
*Attorney, Agent, or Firm*—John G. Premo; Robert A. Miller; John S. Roberts, Jr.

[57] ABSTRACT

A water-based paste which is curable to a flowing glass which is made generally from boric acid, silica flour, or diatomite silica. Generally, silica flour is added for pipe sealer or diatomite-type silica for cap sealers. Optional additives are latex and Kelzan for modifying rheology and trisodium phosphate to fine control the softening point. These compositions may be utilized in standpipes and collecting mains in coke ovens. The softening point of the composition is selected so that it is compatible with the operation of the coke oven. Softening temperatures for these compositions range from about 400° C. to about 750° C. and the boric acid and silica components were selected with a particle size ranging from about 44–210 microns.

10 Claims, No Drawings

ASCENSION PIPE AND ASCENSION PIPE CAP SEALERS FOR BY-PRODUCT COKE OVENS

This invention relates to a water-based paste which is curable to a flowing glass which is made generally from boric acid, silica flour, or diatomite silica. Generally, silica flour is added for pipe sealer or diatomite-type silica for cap sealers. Optional additives are latex and Kelzan for modifying rheology and trisodium phosphate to fine control the softening point. These compositions may be utilized in the standpipes and collecting mains of coke ovens. The softening temperature of the composition is selected so that it is compatible with the operation of the coke oven.

The material is applied to the sand seal, slip collar and cap providing good seal. As the material is heated, it dries and softens, forming a borosilicate glass seal having expansion characteristics similar to those of the pipe. Any cracks that develop during cycling are self-healing since the glass's softening point is matched for the coke oven's temperature.

PRIOR ART STATEMENT

Water-soluble boron silica compositions which are curable or convertible to glass have been known in the art and are illustrated in the prior art by U.S. Pat. No. 4,169,735 Boberski et al.

THE INVENTION

This invention is a water-based paste to be used as ascension pipe and ascension pipe cap sealers in by-product coke ovens. Paste is made from boric acid, silica flour, diatomite-type silica, latex and Kelzan, with trisodium phosphate additions used to control and vary the softening point to match coke oven operating temperature. This allows cracks to self-heal since the softening point of the glass matches the coke oven temperatures.

As stated previously, compositions of this invention are useful sealers for the ascension pipes, ascension pipe caps, and collecting means of by-product coke ovens. Diagrams of the ascension pipes and stand pipes of a Koppers Company, Inc. type by-product coke oven are found in FIG. 4–13, and collecting means, ascension pipe, and stand pipes of a typical Wilputte arrangement are found in FIG. 4–14 of *The Making, Shaping and Treating of Steel*, 9th Ed., Copyright 1971 (page 124) which is hereinafter incorporated by reference into this specification. Additionally, a diagram of a typical Wilputte underjet by-product oven, including the ascension pipe and collecting means is found in FIG. 4–31, page 139 of the same publication which is also incorporated by reference. The compositions of the present invention are placed where seals are needed to prevent the escape of hot gas and coke by-products, and such placement will be readily apparent to those skilled in the art.

The table below shows the compositions of the present invention and it is noted that generally the compositions are aqueous and convertible to glass upon application of heat driving off the aqueous component. Where boric acid and silica are both present, the final product is $\frac{3}{4}:\frac{1}{4}$ boric acid:silica. The exact formulation is dependent upon its prime source of use which is the by-product coke oven and the temperature of conversion is about 750° C., otherwise known as the softening temperature. There is a variation of minor components such as Polyco 2151, which is a vinyl acetate/acrylic oil-in-water emulsion (Borden); xanthan gum, a seaweed type product manufactured by the Kelco Division of Merck; Celite 300, a diatomaceous earth silica manufactured by Johns Manville. In the most modern version of the process coal slag fines were used as an inexpensive filler to reduce the generally high cost of the composition.

The addition of trisodium phosphate in adaptable percentages results in a sharp drop in the softening temperature from about 750° C. to about 400° C. and where low softening products are desired, this additive is necessary.

In the utilization of both boric acid and silica, the particle size of the component is varied from about 325 mesh to 65 mesh, or effectively from 44–210 microns. It was found that the effective surface area for the smaller particles made greater contact area and thus effected the utility of the composition in a more desirable manner.

Compositions, Weight Percent

| Formula No. | Boric Acid | SiO$_2$ | Vinyl Polymer Emulsion | Water | Xanthan Gum | Diethylene glycol | Diatomaceous earth silica[b] | Methanol | Trisodium phosphate | Coal slag fines |
|---|---|---|---|---|---|---|---|---|---|---|
| A | 62[a] | 21[c] | 3 | 14 | 0 | 0 | 0 | 0 | 0 | 0 |
| B-1 | 62[a] | 21[d] | 2.85 | 14 | 0.15 | 0 | 0 | 0 | 0 | 0 |
| B-2[e] | 62[a] | 21[d] | 2.85 | 10 | 0.15 | 4.0 | 0 | 0 | 0 | 0 |
| C-1 | 25.2[a] | 0 | 0 | 55 | 0 | 0 | 19.8 | 0 | 0 | 0 |
| C-2[e] | 25.2[a] | 0 | 0 | 45 | 0 | 0 | 19.8 | 10 | 0 | 0 |
| D-1[f] | 51[a] | 20.6[d] | 2.8 | 15.65 | 0.15 | 0 | 0 | 0 | 9.8 | 0 |
| D-2[f,e] | 51[a] | 20.6[d] | 2.8 | 10–11.15 | 0.15 | 4.5–5.65 | 0 | 0 | 9.8 | 0 |
| E[g] | 10.3[c] | 0 | 0 | 52.63 | 0.07 | 0 | 13.0 | 10 | 0 | 14 |

[a] 210 microns, particle size
[b] 48 microns, particle size
[c] 44 microns, particle size
[d] 150 microns, particle size
[e] Winter grade with alcohol
[f] Low melting composition, 426–482° C.
[g] Low cost

EXAMPLE

Formula A was applied to the slip joint collar of an oven on a Wilputte design battery three meters in height. The method of application was to first soak the fiberfrax rope in water for ease of packing the rope in the joint. Then the composition was troweled in and over the rope to form a seal. Although some surface cracking appeared, a seal was formed below the surface which, due to the temperature, had to be formed from a high-temperature glass. The temperature of the interior of the slip joint collar was in the range of 482°–816° C.

I claim:

1. A curable composition useful in oven sealers comprising an aqueous solution of a composition which is a combination of silica and from about 44–75% by weight of a water-soluble borate having a curing temperature in the range of about 400°–775° C. and each having a particle size in the range of 44–210 microns.

2. The composition according to claim 1 having the following weight percent analysis:
   62% Boric acid
   21% Silica
   3% Vinyl acetate/acrylic emulsion polymer
   14% Water 3. The composition according to claim 1 having the following weight percent analysis which, when heated to 750° C. forms a viscous glass with a composition of 52.3% $B_2O_3$ and 37.7% $SiO_2$:
   62.00% Boric acid
   21.00% Silica
   2.85% Vinyl acetate/acrylic emulsion polymer
   14.00% Water
   0.15% Xanthan gum 4. The composition according to claim 1 having the following weight percent analysis which, when heated to 750° C. forms a viscous glass with a composition of 52.3% $B_2O_3$ and 37.7% $SiO_2$:
   62.00% Boric acid
   21.00% Silica
   2.85% Vinyl acetate/acrylic emulsion polymer
   10.00% Water
   0.15% Xanthan gum
   4.00% Diethylene glycol 5. The composition according to claim 1 having the following weight percent analysis:
   25.2% Boric acid
   55.0% Water
   19.8% Diatomaceous earth silica 6. The composition according to claim 1 having the following weight percent analysis:
   25.2% Boric acid
   45.0% Water
   19.8% Diatomaceous earth silica
   10.0% Methanol 7. The composition according to claim 1 having the following weight percent analysis, having a softening point at 426°–482° C.:
   51.0% Boric acid
   20.6% Silica
   2.8% Vinyl acetate/acrylic emulsion polymer
   15.65% Water
   0.15% Xanthan gum
   9.8% Trisodium phosphate 8. The composition according to claim 1 having the following weight percent analysis:
   51.0% Boric acid
   20.6% Silica
   2.8% Vinyl acetate/acrylic emulsion polymer
   10–11.15% Water
   0.15% Xanthan gum
   4.5–5.65% Diethylene glycol
   9.8% Trisodium phosphate 9. The composition according to claim 1 having the following weight percent analysis:
   10.3% Boric acid
   52.63% Water
   0.07% Xanthan gum
   13.0% Diatomaceous earth silica
   10.0% Methanol
   14.0% Coal slag fines 10. A method of treating and applying the composition set out in claim 1 which comprises applying said composition to heated portions of Wilputte type coke ovens denoted as ascension pipe and sealers.

* * * * *